June 9, 1953 W. A. HAZLETT 2,641,282
PRESSURE OPERATED COLLAPSIBLE VALVE
Filed March 16, 1949 2 Sheets-Sheet 1

INVENTOR.
William Hazlett
BY Joseph L. Baldwin
ATTORNEY

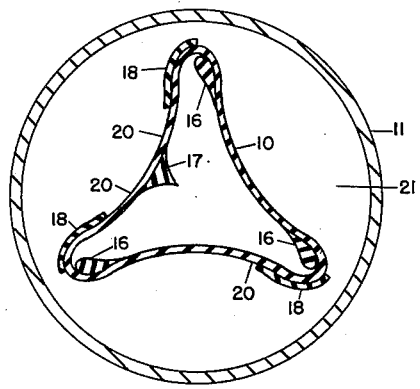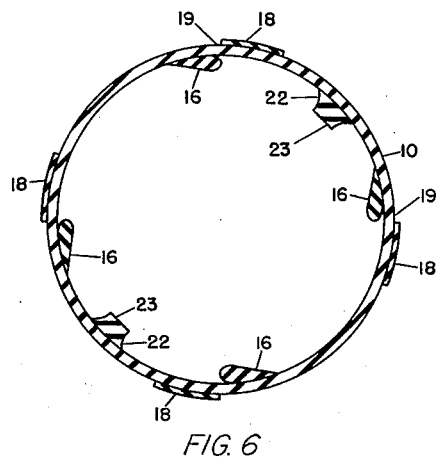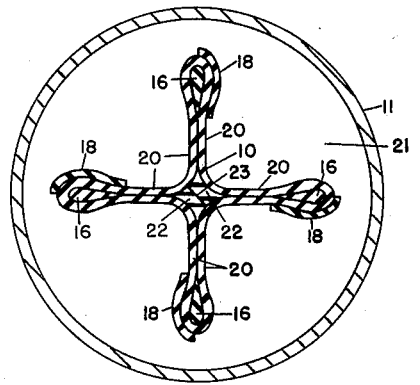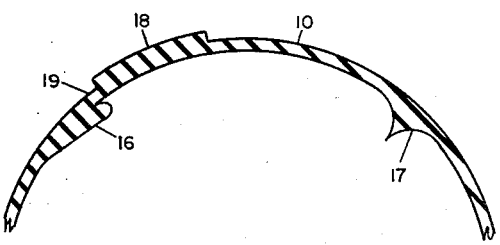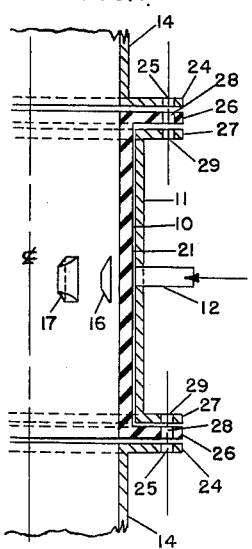

Patented June 9, 1953

2,641,282

UNITED STATES PATENT OFFICE 2,641,282

PRESSURE OPERATED COLLAPSIBLE VALVE

William A. Hazlett, Baltimore, Md.

Application March 16, 1949, Serial No. 81,695

10 Claims. (Cl. 137—688)

This invention relates to a pressure fluid operated valve embodying a flexible tubular valve member located within a casing, having means for admitting pressure fluid to effect a closing by the inward collapse or constriction of the flexible tubular valve member.

In many applications of valves for controlling the flow of fluids or other materials through pipes or conduits, metallic valves are unsatisfactory because of their high cost and the fact that the metallic parts of the valve may become oxidized and corroded. Also, material may so clog the parts of a metal valve as to prevent its movement to full open or full closed position as desired.

It is the principal object of this invention to provide a pressure operated flexible tubular valve, preferably made of rubber, which is adapted to shut off or otherwise control the flow of fluids or other materials through a pipe or conduit in such a manner as to effectively prevent leakage when in closed position.

A further object of the invention is to provide a pressure operated flexible tubular valve which is clog-proof when in open position.

Another important object is to provide a pressure operated flexible tubular valve mounted in a surrounding casing which functions as a pressure chamber, the valve and casing assembly being capable of manufacture as a unit and being adaptable for easy installation in a material conveying pipeline or conduit.

Another object is to so fabricate the flexible tubular valve member that, when subjected to external pressure, it will always collapse or constrict in the same predetermined manner and effect a leak-proof closing.

A still further object of the invention is to provide a pressure operated valve which moves from collapsed or closed position to full open position when external pressure fluid is removed.

Another object of the invention is to provide a pressure operated flexible tubular valve member adapted to be collapsed or constricted when subjected to external pressure, and provided with properly spaced internal tabs and projections arranged to fill and seal all bights and folds when the member is in closed position.

Other objects and advantages will become apparent as the disclosure proceeds and the description is read in conjunction with the accompanying drawings, in which:

Fig. 5 is a transverse sectional view showing the flexible tubular valve member in partially closed or restricted flow position.

Fig. 6 is a sectional view of a modified form of the flexible tubular valve member in open position; this modified form being so constructed as to form four radially disposed folds when the valve is in closed position.

Fig. 7 is a sectional view of the modified form shown in Fig. 6, the flexible tubular valve member being in its associated casing under external pressure, and in closed position.

Fig. 8 is an enlarged fragmentary section of a portion of the flexible tubular valve member, showing a streamline tab, a projection and an external flat tab made integral or homogeneous with the wall of the valve member.

Fig. 9 is a fragmentary vertical sectional view of a modified form in which the flexible tubular valve member and its associated casing have flanged ends to facilitate installation or attachment to flanged pipes or conduits.

Similar reference numerals refer to similar parts throughout the several views of the drawings.

Figure 1:
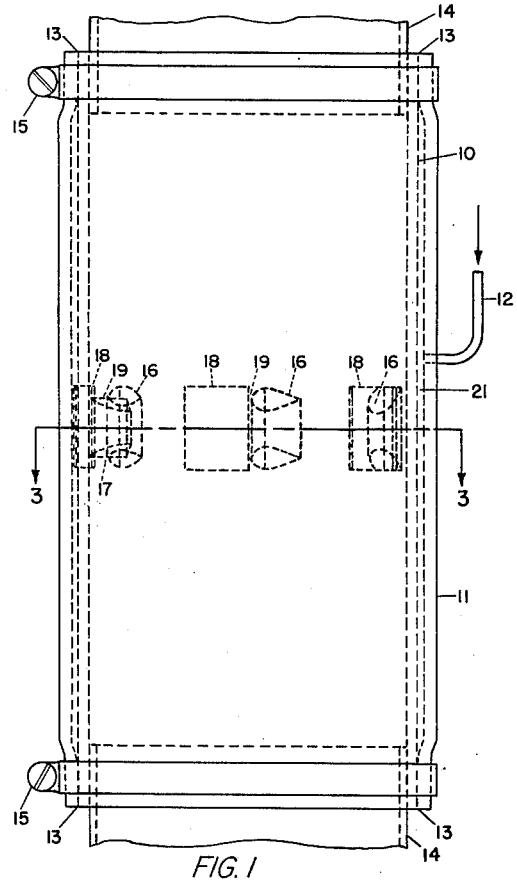
Fig. 1 is a vertical elevation of a preferred embodiment of my invention, showing the flexible tubular valve member and its casing connected with a pipeline or conduit.
Figure 2:
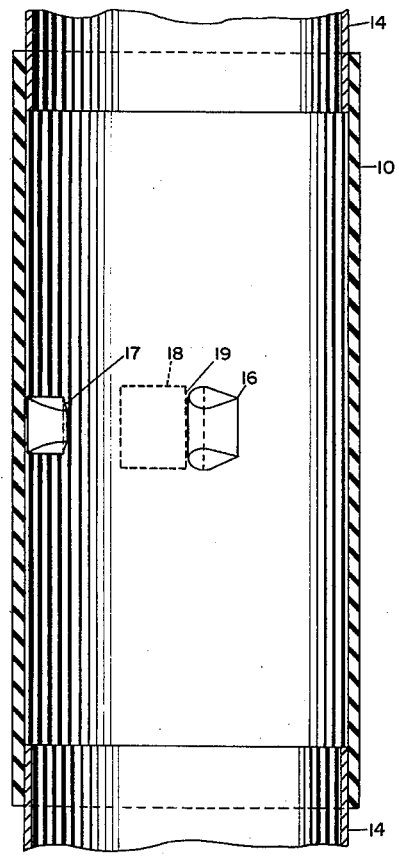
Fig. 2 is a vertical sectional view of the flexible tubular valve member with the casing removed, taken on line 2—2 of Fig. 3.

Referring now to the preferred arrangement of the invention illustrated in Fig. 1 to Fig. 5 inclusive of the drawings, the flexible tubular valve member 10, preferably made of rubber, is of circular cross section and is located concentrically within an outer cylindrical casing 11. The outer casing 11 functions as a pressure chamber, and is connected by means of a pipe 12 to a source of pressure operating fluid (not shown). Suitable means, not shown in the drawings, are provided for controlling the flow of the pressure medium through the pipe 12 into the casing 11, between the inner surface of the wall of the casing 11 and the outer surface of the flexible tubular valve member, this annular space being indicated at 21. The pressure fluid causes the collapse or constriction of the valve member in a manner explained more fully hereinafter. The outer casing 11 is made of material which is non-expanding or of sufficient rigidity to be unaffected by the pressure fluid which is utilized to effect the collapse or closing of the flexible tubular valve member.

As shown in Fig. 1 of the drawings, each end of the flexible tubular valve member 10 may be vulcanized around the entire periphery as at 13, to the outer casing 11 in a leak-proof manner. It will be seen that a pressure chamber 21 is thus formed in the annular space between the casing 11 and flexible tubular valve member 10 intermediate the peripheral vulcanization at 13. Thus, the tubular valve 10 and the outer casing 11 can conveniently be manufactured and assembled as a unit prior to installation in a pipeline or conduit. The assembly of tubular valve member 10 and outer casing 11 is secured by a leak-proof connection at each end to a pipe or conduit 14. The specific details of this connection form no part of the present invention. One way of connecting the assembled valve member 10 and casing 11 to the pipeline is by means of suitable clamps 15, as shown in Fig. 1 of the drawings. When thus installed in the pipeline, the pipe portions 14 are interconnected by the assembled casing 11 and flexible tubular valve member 10.

Figure 3:
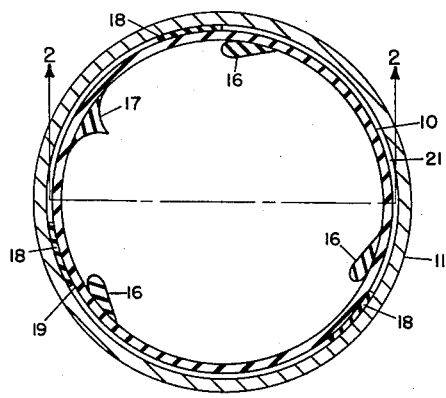
Fig. 3 is a transverse sectional view taken on line 3—3 of Fig. 1, showing the flexible tubular valve member in open position.

The flexible tubular valve member 10 has at a mid-point between its ends an arrangement which not only effectively prevents leakage when the pressure medium causes the collapse of the valve to closed position, but also controls the movement of the valve to closed position in a predetermined manner. As illustrated in Fig. 1 to Fig. 5 inclusive, this arrangement includes three suitably spaced streamline tabs 16 and a projection 17, the tabs and projection extending inwardly from the inner surface of the wall of the flexible tubular valve member 10 as shown in Fig. 3. On the outer surface of the wall of the flexible tubular valve member 10, there are three external flat tabs 18. A flat tab 18 terminates on the outer surface of the valve member at a point slightly staggered from the point on the inner surface of the valve member at which the thickened end of a streamline tab 16 joins the valve body, leaving a relatively thin or weaker wall section at 19. With this arrangement, the external flat tabs 18 co-act with the relatively thin wall sections 19 and streamline tabs 16 and cause the folding to commence at the desired points when pressure fluid is admitted to the casing 11 and forces the flexible tubular valve member to collapse or constrict to closed position.

The streamline tabs 16, projection 17, and external flat tabs 18 may be secured to the walls of the flexible tubular valve member 10 by gluing or vulcanizing, or the members 16, 17 and 18 may be molded or otherwise made integral or homogeneous with the body of the valve member 10, as illustrated in Fig. 8 of the drawings. The tabs 16 and projection 17 are made of a size and shape to prevent leakage in the bights of the folds and at the central intersection of the folds when the valve is closed. However, the members 16 and 17 are small enough not to cause obstruction to flow or clogging in the pipe 14 when the valve is in open position.

Figure 4:
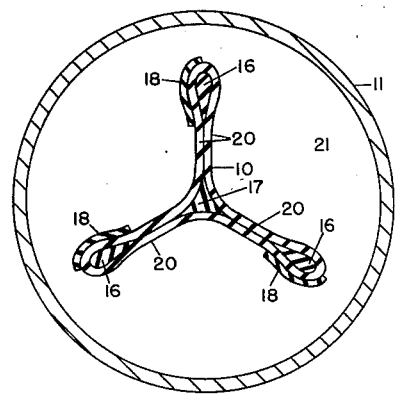
Fig. 4 is a transverse sectional view, similar to Fig. 3, showing the valve in closed position, and the three radially disposed folds which are formed when external pressure fluid causes the flexible tubular valve to collapse or constrict to closed position.

When the pressure fluid is admitted to the casing 11, the flexible tubular valve member collapses or constricts to the closed position shown in Fig. 4. Each outer flat tab 18, co-acting with the thickened end of the adjacent streamline tab 16, has caused the folding to commence at the desired point at the relatively thin or weaker wall sections 19, and the wall of the flexible tubular valve member folds around the thickened end of each streamline tab as the pressure fluid collapses or constricts the valve to closed position. In the closed position (Fig. 4) the valve member 10 has collapsed so as to form three radially disposed folds 20. The wall of the flexible tubular valve member 10 has folded around the thickened end of each streamline tab 16, and the three streamline tabs 16 effectively seal the bight of each fold and prevent leakage when the valve is in closed position. Also, as shown in Fig. 4, the pointed projection 17 has moved inwardly to a central position where it effectively seals the central intersection of the walls which define each fold.

From the foregoing description, it is obvious that I have provided a closure member comprising a deformable flexible tubular valve which is pressure operated. The streamline tabs 16 on the inner surface of the valve member 10 not only co-act with the external flat tabs 18 through the medium of the relatively thin wall sections 19 to control the manner of deforming or collapsing of the flexible tubular valve member 10 when pressure medium is admitted to the area 21 inside casing 11, but the streamline tabs 16 also seal or close all bights in the folds when the valve member is in the closed position shown in Fig. 4 of the drawings.

The flexible tubular valve member 10 is shown to be in partially closed position in Fig. 5 of the drawings. This figure illustrates the position of the valve as it is in the course of moving to fully closed position, and shows the three folds 20, in the process of forming about the streamline tabs 16, and the projection 17 is directed toward the central position where it is adapted to seal the void at the central intersection of the three folds, when sufficient pressure fluid is admitted to effect a full closing of the valve member. Fig. 5 also illustrates an example of a partially closed position of the valve 10 to control or regulate the flow of material through the pipe or conduit 14. It is obvious that the flexible tubular valve member 10 could be held in the partially closed position shown in Fig. 5, or in any other partially closed position by controlling the pressure medium in casing 11.

Referring now to the modified form of the invention shown at Fig. 6 and Fig. 7 of the drawings, it will be seen that the only material differences from the preferred form previously described, are the provision of four, instead of three, co-acting sets of streamline tabs 16 and external flat tabs 18, and the provision of two internal projections 22. The four streamline tabs 16 are spaced approximately 90° apart; and the four external flat tabs 18 are also spaced approximately 90° apart. In the modified form (Fig. 6 and Fig. 7), the flexible tubular valve member 10 has two internal projections 22 spaced approximately 180° apart. Each projection 22 is secured to or integral with the inner wall of the flexible tubular valve member mid-way between two adjacent streamline tabs 16. The inner end of each projections 22 is flattened as shown at 23. The projections 22 are adapted to move radially to the center, and their meeting edges 23 come together and abut to form a tight seal when this form of the invention is collapsed to closed position as illustrated in Fig. 7 of the drawings.

In the modified arrangement shown in Fig. 6 and Fig. 7, the streamline tabs 16 and the external flat tabs 18 co-act in exactly the same manner as previously described in connection with Figs. 1 to 5 inclusive. However, as shown in Fig. 7, four radially disposed folds 20 are formed when pressure fluid is admitted to the casing 11 to effect the collapse or constriction of the flexible tubular valve member to full cut-off or closed position. In closed position, the bights of the folds are tightly sealed by the streamline tabs 16, and the void at the central intersection of the four folds is effectively sealed by the meeting of the two projections 22. Upon release of the collapsing pressure fluid from casing 11, the flexible tubular valve member 10 will return to its cylindrical form of circular cross section; in this open position the tabs 16 and projections 22 offer virtually no obstruction to the passage of material through the pipe or conduit in which the flexible tubular valve member and its associated casing are installed.

Fig. 9 shows a modified form in which the flexible tubular valve member 10 and its associated outer casing 11 are arranged for installation in a pipe or conduit 14 having flanged ends at the points where the flexible tubular valve member and casing are installed in the pipeline. As shown in Fig. 9, the pipe 14 has an outstanding circumferential flange 24 provided with suitable bolt holes 25. At each end the flexible tubular valve member 10 and its associated outer casing 11 are provided with mating outstanding flanges indicated respectively at 26 and 27. The flanges 26 and 27 are provided respectively with bolt holes 28 and 29 which may be aligned with the bolt holes 25 in the pipe flange 24. In an obvious manner, bolts (not shown) may be inserted in the mated bolt holes and tightened so as to effect a fluid-tight installation of the flexible tubular valve member and its outer casing in a flanged pipeline. In this modified form, the outstanding flange 26 at each end of the flexible tubular valve member is disposed between the pipe flange 24 and the casing flange 27 and a fluid-tight joint is provided. Streamline tabs, projections, and external flat tabs, as previously described, are provided to seal the bights and fold intersection, and control the manner of collapsing when the modified arrangement of Fig. 9 is collapsed to closed position by the pressure fluid.

In making this invention, I have conducted tests with flexible tubular valve members of various diameters and various kinds of rubber or flexible tubing of different thicknesses. During these tests I have discovered that the number of radially disposed folds, which the flexible tubular valve member has a natural tendency to form when installed in a casing and subjected to external pressure, is a function of the ratio of the thickness of the flexible material to the diameter of the valve. By varying this thickness-diameter ratio through different ranges, I have discovered that the flexible tubular valve member has a tendency, when subjected to external pressure medium, to collapse so as to form two, three, four or more radially disposed folds, the number of folds being dependent upon the thickness-diameter ratio. However, in order to control the number of folds and assure the folding or collapsing of the valve in the same predetermined manner each time pressure fluid is admitted to the casing to effect a closing, and also to assure a leak-proof shut-off position, I provide the hereinbefore described streamline tabs, projections and external flat tabs on the inner and outer surfaces of the wall of the flexible tubular valve member.

With my novel pressure operated valve installed in a pipeline 14 to control the flow of fluid or other material therethrough, the operation is as follows:

In the open position of the flexible tubular valve member, as shown for example in Fig. 1, Fig. 3 and Fig. 6 of the drawings, the valve offers substantially no obstruction to the flow of material through the pipeline 14. Upon the admission of pressure fluid through the pipe 12 into the space 21 of the casing 11 which surrounds the flexible tubular valve member 10, the collapse of the flexible tubular valve member takes place and portions of the perimeter of valve member 10 move toward the center as the external collapsing pressure increases in the pressure chamber or casing 11. The arrangement of external flat tabs 18, relatively thin or weaker wall sections 19 and co-acting streamline tabs 16, causes the folding or collapsing to commence at the desired points and the flexible tubular valve member collapses to the closed position shown in Fig. 4 or Fig. 7. In the arrangement shown in Fig. 4 the flexible tubular valve member has collapsed or closed in such a manner as to form three radially disposed folds 20. In the closed position shown at Fig. 7, the flexible tubular valve member has collapsed or closed in such a manner as to form four radially disposed folds 20. In the closed position the bights of the folds are sealed by the streamline tabs 16 and the central intersection of the folds is effectively sealed by the projection 17 in Fig. 4, or the projections 22 in Fig. 7. In closed position the meeting walls of the radially disposed folds, the streamline tabs in the bights of the folds and the projections at the central intersection of the folds, all unite to form a complete seal with consequent full shut-off of the material flowing through the pipeline 14. Upon release of the pressure medium from the area 21 of the casing 11, the flexible tubular valve member returns to its circular cross section or the open position as illustrated in Fig. 1, Fig. 3 and Fig. 6 of the drawings.

The valve of the present invention is capable of a wide variety of uses in successfully controlling the flow of granular materials or the flow of fluid through pipelines or conduits. One specific use in which I have successfully employed this valve is in the control of the discharge of toilet waste from vehicles.

The foregoing description of my invention is made for the purpose of disclosure and to illustrate the principles involved, and will suggest various substitutions and changes that may be made under my basic concepts; the right is reserved to all such substitutions and modifications that lie within the scope of the appended claims.

I claim:

1. A new article of manufacture consisting of a cylindrical casing of circular cross section which concentrically surrounds a flexible tubular valve member, the ends of the casing and the ends of the valve member being connected so as to define a fluid-tight space between the inner surface of the casing and the outer surface of the valve member, said valve member having integral tabs of streamline shape on its inner surface and integral flat tabs on its outer surface, said tabs on the inner and outer surfaces of the valve member being disposed circumferentially around the valve surfaces in the same plane transversely of the valve, each of the outer flat tabs being located in slightly staggered relation to an adjacent inner streamline tab thereby providing a relatively weak wall section between the thickened end of each streamline tab and each outer flat tab.

2. A pressure operated valve comprising a flexible tube adapted to be folded to closed position by pressure fluid, said tube having integral tabs on its inner and outer surfaces to control folding of the tube in a predetermined manner, the inner and outer tabs being of substantially equal length and all lying in a common plane transversely of the tube.

3. A pressure fluid operated valve comprising a flexible tubular valve member mounted concentrically within an outer casing, the ends of the member and the ends of the casing being secured together in a leak-proof manner, thereby defining a pressure chamber between the inner side of the wall of said casing and the outer side of the wall of said member, said member being adapted to collapse and form a plurality of folds having a central intersection and a bight at the radial extremity of each fold, the inner side of the wall of said member having an integral projection adapted to seal said central intersection of the folds and said inner side of the wall of said member also having a plurality of integral tabs adapted to seal all bights of the folds when pressure fluid is admitted to said pressure chamber to effect the collapse of the flexible tubular valve member to closed position, said valve member having on its outer surface a plurality of external flat tabs arranged to cooperate with the inner tabs and control the collapse of the flexible tubular valve member in a predetermined manner, each external tab being positioned to overlie an inner tab when the valve is in closed position.

4. A flexible tubular valve member adapted to be mounted within a casing, means for admitting pressure fluid to the casing for effecting the inward collapse of said valve member and a plurality of inner and outer tab members integral with the inner and outer surfaces of the wall of said valve member, said tab members being disposed in a cooperative relationship circumferentially around the inner and outer surfaces of the wall of the valve member at the mid-point between the ends of the said valve for controlling the collapse of the member in a predetermined manner whereby when fluid pressure is applied uniformly on the outer surface of the tubular valve member said valve member collapses and forms more than two radially disposed folds.

5. The combination defined by claim 4 wherein the tab members on the inner surface of the tubular valve member are streamlined in shape and the cooperating tabs on the outer surface of the tubular member are flat.

6. A pressure operated valve comprising a flexible tubular member mounted concentrically within a casing and means for admitting pressure medium to said casing for effecting the folding of said member, integral tabs on the inner and outer surfaces of said tubular member, said tabs being disposed circumferentially around the inner and outer surfaces of the tubular member in the same plane transversely of the tubular member to insure folding in a predetermined manner, the tabs on the inner surface of the tubular member being adapted to seal bights of the folds when said member is in closed position.

7. A pressure operated flexible tubular valve member adapted to be closed by a folding commencing at weaker wall sections of the member, each weaker wall section disposed between adjacent inner and outer tabs located respectively on the inner and outer surfaces of the wall of the valve member, said inner and outer tabs located at a mid-point between the ends of the valve and said tabs cooperating to cause the valve to fold to closed position in a predetermined manner when fluid pressure is applied uniformly on the outer surface of the tubular valve member.

8. The combination defined by claim 7 in which the inner and outer tabs are of substantially the same length and are located in a common plane transversely of the valve member.

9. A pressure fluid operated valve comprising a flexible tube member operable to its closed position by pneumatic pressure and to its open position by inherent resiliency of the flexible tube member upon release of the pneumatic pressure, said flexible tube member having integral tabs and an integral projection on its inner surface for effecting a fluid-tight seal when in closed position, a plurality of tab members on the outer surface of the flexible tube member, the tab members on the inner and outer surfaces and the projection on the inner surface being disposed circumferentially about the flexible tube member in the same plane, the tabs on the outer surface of the flexible tube being slightly staggered circumferentially on the flexible tube from the tabs on the inner surface to effect collapse of the flexible tube member in a plurality of radially disposed folds when the exterior of said flexible tube member is subjected to pneumatic pressure.

10. A pressure operated flexible tubular valve member adapted to fold circumferentially on itself in a predetermined number of more than two radially disposed folds when fluid pressure is exerted uniformly on the outer surface of the tubular member, the folding commencing at weaker wall sections disposed between inner and outer tabs alternately spaced circumferentially on the inner and outer surfaces of the flexible tubular valve member, the said inner and outer tabs being of substantially equal length and lying in the same plane transversely of the tubular valve member.

WILLIAM A. HAZLETT.

References Cited in the file of this patent

UNITED STATES PATENTS

| Number | Name | Date |
|---|---|---|
| 143,907 | Hyde | Oct. 21, 1873 |
| 515,290 | Ives | Feb. 20, 1894 |
| 591,067 | Wallace | Oct. 5, 1897 |
| 2,352,642 | Langdon | July 4, 1944 |
| 2,467,150 | Nordell | Apr. 12, 1949 |